United States Patent [19]

Rabalais

[11] Patent Number: 5,197,567
[45] Date of Patent: Mar. 30, 1993

[54] REPLACEMENT DRAIN HOLE CLOSURE

[75] Inventor: Keith J. Rabalais, Alexandria, La.

[73] Assignee: R & B, Inc., Colmar, Pa.

[21] Appl. No.: 698,153

[22] Filed: May 10, 1991

[51] Int. Cl.⁵ .......................................... F16N 33/00
[52] U.S. Cl. ..................................... 184/1.5; 220/235;
220/244; 411/344
[58] Field of Search ..................... 184/1.5, 105.3, 90;
220/233, 234, 235, 236, 243, 244; 411/435, 342,
346, 344, 369, 542, 915

[56] References Cited

U.S. PATENT DOCUMENTS

| | | | |
|---|---|---|---|
| 2,334,012 | 11/1943 | Koch et al. | 220/244 |
| 2,882,547 | 4/1959 | Bacon | 411/435 |
| 3,566,738 | 3/1971 | Cupit | 411/369 |
| 3,646,314 | 2/1972 | Windsor | 220/233 |
| 3,811,650 | 5/1974 | Dehar | 184/1.5 |
| 3,910,550 | 10/1975 | Nelson | 184/1.5 |
| 3,982,656 | 9/1976 | Kusmierski et al. | 220/243 |
| 4,457,653 | 7/1984 | Leib | 411/344 |
| 4,574,971 | 3/1986 | Leonard | 220/235 |
| 4,714,138 | 12/1987 | Zaccome | 184/1.5 |

OTHER PUBLICATIONS

Motormite Products Catalog, 1991, face page, insert page, and pp. 272 and 273.

Primary Examiner—Ira S. Lazarus
Assistant Examiner—Alan B. Cariaso
Attorney, Agent, or Firm—Volpe and Koening

[57] ABSTRACT

A replacement closure assembly for the drain hole of a fluid reservoir is disclosed. The assembly is comprised of a threaded shaft portion which includes a clamping member at one end thereof and a backing member at the other end thereof. A sealing member is provided between the clamping member and the backing member and is dimensioned to close the drain hole opening. In the preferred embodiment, the clamping member is formed about a threaded pivot member which is secured on the threaded portion of the shaft. In use, the clamping member is passed through the drain hole and brought into engagement with the interior of the reservoir. The shaft is then threaded through the clamping member until the sealing member is urged into contact with the drain hole. The backing member provides a continuous contact between the sealing member and the reservoir.

20 Claims, 3 Drawing Sheets

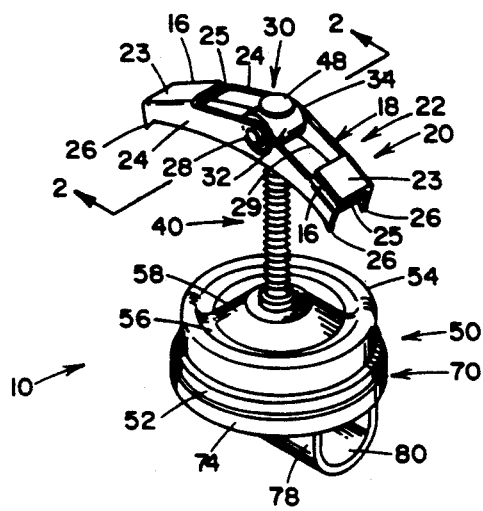
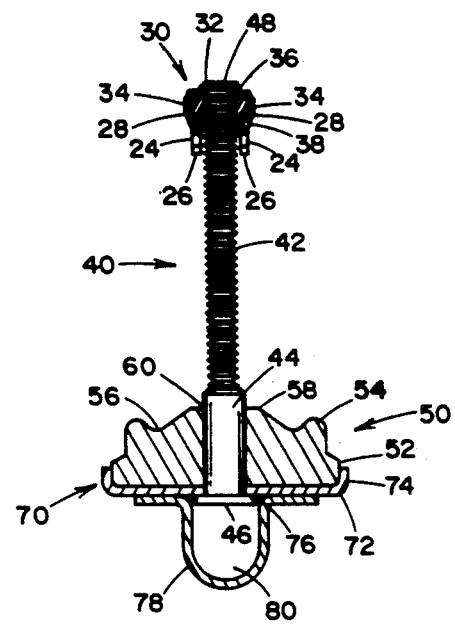
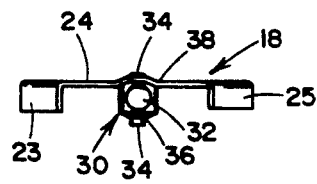
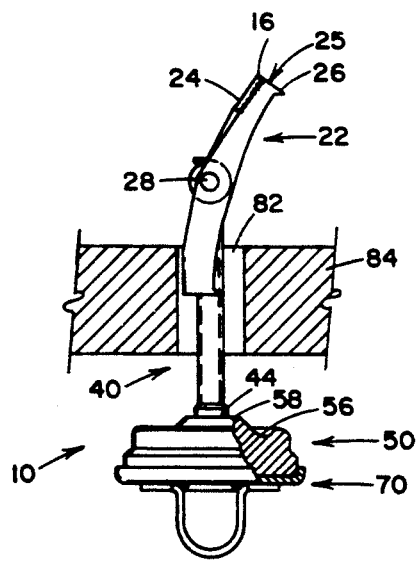
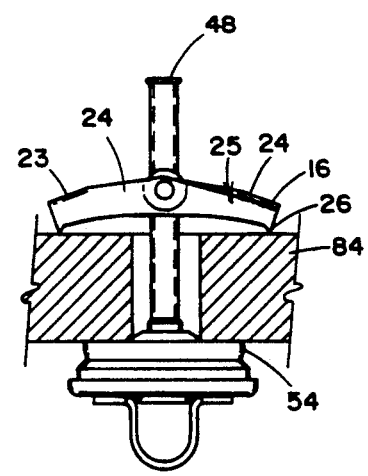
FIG. 1
FIG. 2
FIG. 5
FIG. 3
FIG. 4

REPLACEMENT DRAIN HOLE CLOSURE

BACKGROUND OF THE INVENTION

1. Field of the Invention

The present invention generally relates to replacement drain closures for the drain hole of a fluid reservoir. More particularly, the present invention relates to replacement drain closures for use in the drain hole of an oil pan or lubricant reservoir of an engine. Most particularly, the present drain closure is intended for use in the drain hole of an automotive oil pan.

2. Prior Art

As will be known to those skilled in the art, the drain hole of an oil pan is subject to several types of damage which may render the original drain plug useless. In one type of damage, the threaded member which receives the drain plug may be damaged such that the original plug is no longer functional. If the original female member of the pan is cracked or the threads are damaged to the extent that the male plug member no longer securely threads into the female member, the plug may be totally useless or may not seal against leakage. In another form of damage, the fluid reservoir may be distorted due to impact with the roadway and this distortion results in a loss of sealing. In addition to the foregone, it is possible that detachment of the female member from the reservoir or oil pan may make it impossible to obtain an oil tight seal.

If view of the above, the prior art has developed expansion type plugs which are intended to replace the original drain plug. However, such prior art devices frequently require specialized tools and are often unable to conform to irregularities in the geometry of the oil pan or fluid reservoir. Accordingly, the art still desires a replacement drain plug which will securely close the drain hole and will accommodate irregularities in both the interior and exterior of the pan.

In view of the prior art, it has been concluded that a satisfactory closure must seal the drain aperture without regard to the condition of the original female member and must accommodate irregularities in the pan configuration at the drain hole.

In view of the above, it was concluded that the art required a replacement closure that would accommodate irregularities in the interior and exterior surfaces surrounding the drain hole.

SUMMARY OF THE INVENTION

The present invention provides a replacement closure assembly for the drain hole of a fluid reservoir. The assembly is comprised of a central shaft which includes a threaded portion at one end. A clamping member, sized to pass through the drain hole of the reservoir, is provided with a fastening means that permits attachment to the threaded portion of the shaft. A sealing member is disposed on the shaft at the end opposite the clamping member. A backing member is adjacent to the non-sealing surface of the sealing member and is positioned so as to locate the sealing member between it and the clamping member. In use, the clamping member will be disposed on the interior of the reservoir and the backing member will be used to thread the shaft through the clamping member and establish a sealing contact between the sealing member and the reservoir.

BRIEF DESCRIPTION OF THE DRAWINGS

FIG. 1 is a perspective view of the preferred embodiment of the invention.

FIG. 2 is a sectional view taken through the line 2—2 of FIG. 1. For the sake of clarity, the shaft has not been shown in section.

FIG. 3 illustrates placement of the preferred embodiment of the invention in a drain hole.

FIG. 4 illustrates completes assembly of the preferred embodiment of the invention in a drain hole.

FIG. 5 illustrates one-half of the clamping body member and its assembly with the threaded pivot member.

DETAILED DESCRIPTION OF THE PREFERRED EMBODIMENTS

Figure 6:
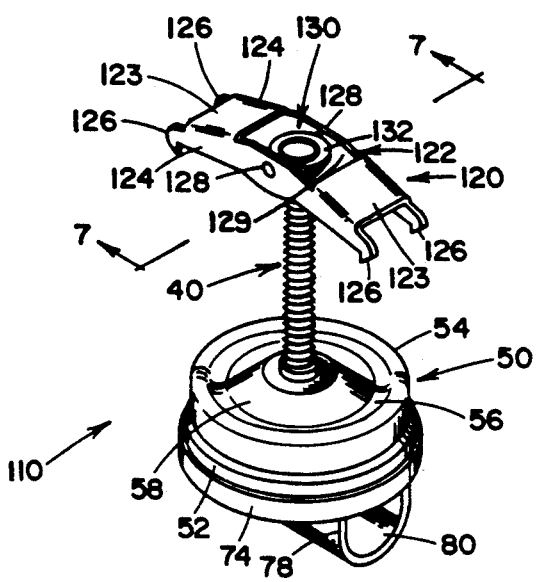
FIG. 6 is a perspective view of an alternative embodiment of the invention.

The invention will be described with respect to the drawing figures and like elements will be identified by the same numeral throughout.

With reference to FIG. 1, there is shown the preferred embodiment of the replacement closure 10. Closure 10 is comprised of a clamping member 20, a threaded pivot member 30, a shaft member 40, a sealing member 50 and a backing member 70. Each of these elements will be described in more detail hereinafter.

With reference to FIGS. 1 and 2, the clamping member 20 is generally rectangular in shape and includes the body 22 and the threaded pivot member 30. The body 22 is generally rectangular. The body 22 is made up of identical body half members 18 each of which has horizontal cross members 23 and 25 and a vertically depending side 24 which terminates at the respective end in a tooth 26. The body 22 is oriented with the teeth 26 disposed downwardly toward the sealing member 50. The sides 24 have apertures 28 which are on a common center line. The cross members 23 and the side members 24 define a rectangular opening 29 which is centered about the apertures 28. In the manufacturing process, each body half member 18 is stamped from sheet metal material, of approximately 17 gauge, as a flat piece and is formed as illustrated in FIG. 5.

Still with reference with FIGS. 1 and 2, the threaded pivot member 30 has a threaded barrel portion 32 and oppositely extending arms 34. The arms 34 are dimensioned to fit closely within the apertures 28 but to still permit the clamping member 20 to rotate about the arms 34. The sides 36 of the pivot member 30, between the barrel portion 32 and the oppositely extending arms 34, are conical or tapered to form a pivot or ball which mates with the socket 38 which is formed in the respective side 24. Two of the identical half members are mated and secured by the welding beads 16. With respect to the threaded barrel portion 32, its thread pattern mates with and complements the threaded portion 42 of the shaft member 40. In the preferred embodiment, the threaded barrel portion 32 is long enough to enclose at least three complete convolutions of the shaft 40.

As can be seen from FIG. 2, the shaft member 40 includes the threaded portion 42 which mates with the threaded barrel 32, the shoulder portion 44 and the end cap 46. The end 48 of the shaft member 40 is flared or peened after the clamping member is assembled to the threaded portion. This prevents dislocation of the clamping member from the shaft 40. The assembly details will be described more fully hereinafter.

With reference to FIG. 5, the half member 18 is configured with a cross member 23 and a cross member 25. The cross member 25 is formed so that it will be in a plane which is directly below the plane which is formed by an opposing cross member 23. By so forming the half members 18, two half members 18 may be assembled to form the body member 22. In assembly, the two half members 18 are positioned opposite each other on either side of the pivot member 30. Each half member is located on a respective arm 34 so that the socket 38 compliments the ball 36. In this position, the cross member 23 overlies the cross member 25 at either end of the body 22. A weld bead 16, as shown in FIGS. 1 and 3, secures the half members 18 into a unit which will pivot about the arms 34. As can be seen with reference to FIG. 2, the apertures 28 are on center line. Likewise, the teeth 26 are parallel and of equal length. As an additional feature of this construction, neither half body member 18 is subject to all of the stress placed on the clamping member 20.

With reference again to FIGS. 1 and 2, the sealing member 50 is an elastomeric material which has been selected to be resistant to oils and hydrocarbons and can withstand continuous exposure to temperatures of at least 250 degrees Fahrenheit. The sealing member 50 includes a base 52, an outer ring 54, a circumferential valley 56, a tapered central nub 58 and a central aperture 60. As can be seen in FIG. 2, shoulder 44 of the shaft member 40 fits snugly within the central aperture 60. While the fit is snug, it is not intended to be so tight as to prevent the rotation of the shoulder 44 within the central aperture 60. While it is desirable to securely retain this sealing member 50 about the shoulder 60 and in the backing member 70, the sealing member should not be subjected to the twist associated with tightening of the screw. The reasoning for this preference will be discussed more fully hereinafter.

Still with reference to FIGS. 1 and 2, the base 52 of the sealing member 50 fits securely within the seat formed by the base 72 and the ring 74 of the backing member 70. The base 72 of the backing member 70 includes the central aperture 76. The end cap 46 of shaft 40 abuts the base 72 and overlies the aperture 76. The final connection between the end cap 46 and the base 72 is made by welding. A finger grip 78 is attached to the base 72. Once again, welding is the preferred method of securing the grip 78 to the base. In the preferred embodiment, the grip 78 defines a channel which will accept an auxiliary tool as will be explained hereinafter.

With reference to FIG. 2, various materials which are suitable for use in the present invention and a method of constructing the invention will be discussed. As noted previously, the body 22 is preferably 17 gauge sheet material which has been cold rolled. The same material may be used for forming the backing member 70. As assembled in FIG. 1, the clamping member has an overall length of approximately 1.65 inches, a width of about 0.3 inches and a maximum height of about 0.40 inches. The rectangular opening 29, between the cross members, is approximately 0.20 by 0.94 inches. The overall length of the shaft 40, from end cap 46 to the end 48 is approximately 2.0 inches. It will be recognized by those skilled in the art that the length of the shaft and the overall dimensions must take into account the available clearance between movable parts and the reservoir defining the drain hole and the size of the drain hole. In the preferred embodiment, the shoulder 44 has a length of approximately 0.5 inches. It will be understood by those skilled in the art that the shoulder length should be at least equal to the height of the sealing member 50 which is surrounding the shoulder 44. The sealing member 50 is preferably molded of an elastomeric material generally known as polyacrylate, one suitable material is available from B. F. Goodrich under the trade name HYCAR. In the preferred embodiment, the sealing member 50 has a maximum diameter of about 1.125 inches and a maximum height of about 0.45 inches. The outer ring 54 has a radius of about 0.0625 inches which is measured from the floor of the valley 76. The upper arc of the outer ring 54 is approximately 0.0625 inches below the maximum height of the sealing member as defined by the horizontal plane through the top of the central nub 58. The grip 78 has an interior channel which is approximately 0.375 inches wide. While it is preferred that the closure be applied without the assistance of a tool and only be hand tightened, the channel 80 does provide a place for positioning a tool, such as the shaft of a philips tip screw driver, during loosening or removal of the closure. With the aid of such a tool, it is possible to place continuous downward pressure on the clamping member 20 while unscrewing the closure 10. Since the end 48 of the shaft 40 has been flared or peened over, the shaft 40 will not unthread from the clamping member 20.

With reference to FIG. 3, the closure is positioned in the reservoir by pivoting or rotating the body 22 into a vertical position against the shaft 40. This position is maintained as the clamping member 20 is passed through the hole 82 in the reservoir 84. After the body 22 has cleared the hole 82, it falls out of the vertical position and becomes horizontal to the interior of the pan 84. In the event that the body 22 does not rotate under gravity, it may be urged into position with a thin screwdriver or a similar probing tool. The closure 10 is then pulled downwardly to engage the teeth 26 with the interior of the pan 84. As a result of this engagement, the clamping member 20 will be held in a fixed position within the pan and the shaft 40 may be threaded through the barrel 32. As the sealing member comes into contact with the outer surface of the aperture 82, the tapered central nub 58 will initially move into the aperture 82 unrestricted. As the taper of the nub 58 moves further into the aperture, it will contact the pan defining the aperture. This initial contact will preferably take place before the outer ring 54 contacts the pan. As a result of this early contact between the tapered central nub 58 and the base of the pan, the portion of the pan 84 defining the aperture 82 will begin to depress the sealing member 50 and establish an initial area of sealing contact. Continued tightening of the closure will bring the bottom of pan 84 into full contact with the outer ring 54. Due to the provision of the circumferential valley 56 and the free sides of the ring 54 some depression and deformation of the ring will take place and further sealing will be achieved between the pan 84 and the ring 54. As can be seen from the foregoing, a sealing line of contact will be established between the tapered central nub 58 and the reservoir portion which defines the aperture 82. An additional seal will take place between the outer ring 54 and the reservoir 84. It will understood by those skilled in the art that the deformation of the tapered central nub 58 will also seal the aperture 60 to the shoulder 44.

During initial application of the closure, it is preferred that the sealing member be permitted to rotate slightly against the backing member 70 and around the shoulder 44. Once the sealing member has been brought into contact with the aperture and the outer ring has been brought into deforming contact with the pan further tightening of the closure is held to a minimum. At present, it is recommended that the closure be assembled with only hand pressure and that no effort be made to fully deform the sealing member 50.

Because of the compound sealing arrangement, it is believed that full compression of the sealing member is not necessary to assembly or to the accomplishment of an adequate seal. As can be seen from FIG. 4, the outer ring 54 will bulge slightly when the device has been brought into full contact with the pan. As a result of the slight bulging, it is possible to visually inspect the closure and to be sure that it is in full contact with the reservoir or pan.

As will be appreciated by those skilled in the art, complete removal of the closure device from the aperture may be accomplished by unscrewing the closure a sufficient distance to permit the entry of a screwdriver or probing tool into the aperture 82 for the purpose of rotating the body 22 into the vertical position. Having accomplished this position, the closure may then be removed by a simple downward motion.

With reference to FIGS. 6 through 10, there is shown a preferred alternative embodiment of the replacement closure 110. Closure 110 is comprised of a clamping member 120, a threaded pivot member 130, a shaft member 40, a sealing member 50 and a backing member 70. Many of the features of this alternative embodiment are similar to those previously described and will not be mentioned again, only those distinctive features of this embodiment will be described.

Figure 7:
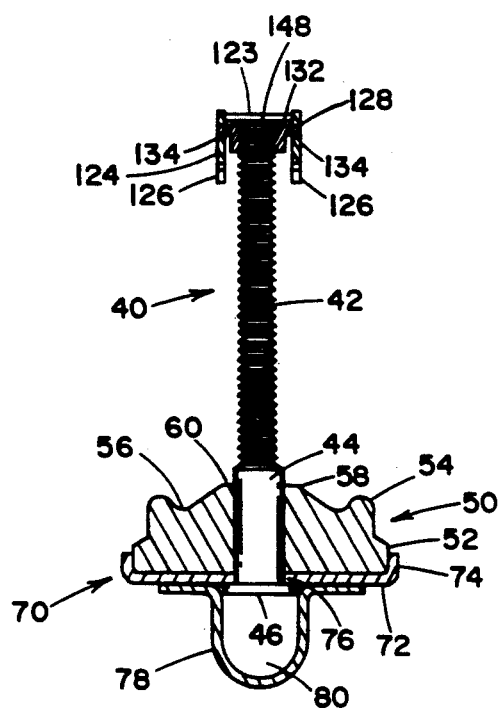
FIG. 7 is a sectional view taken through the line 7—7 of FIG. 6. For the sake of clarity, the shaft has not been shown in section.
Figure 8:
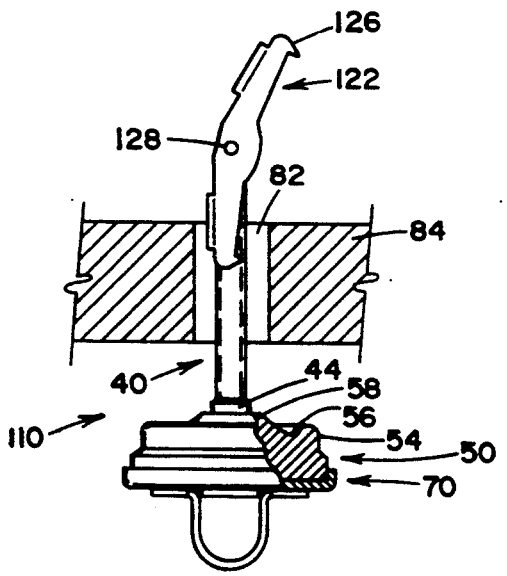
FIG. 8 illustrates placement of the alternative embodiment in a drain hole.
Figure 9:
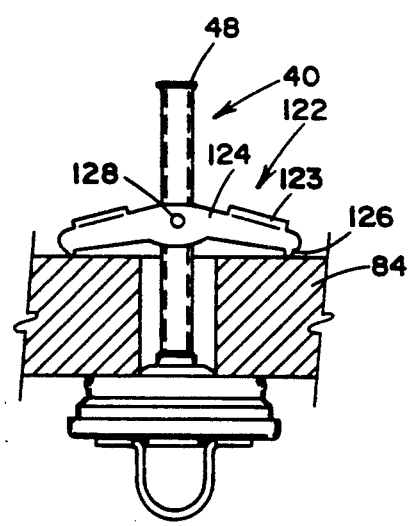
FIG. 9 illustrates completed assembly of the alternative embodiment in a drain hole.

With reference to FIGS. 6 and 7, the clamping member 120 is generally rectangular in shape and includes the body 122 and the threaded pivot member 130. The body 122 is generally rectangular. The body 122 has horizontal cross members 123 and vertically depending sides 124 which terminate at the respective ends in the teeth 126. The body 122 is oriented with the teeth 126 disposed downwardly toward the sealing member 50. The sides 124 have apertures 128 which are on a common center line. The cross members 123 and the side members 124 define a rectangular opening 129 which is centered about the apertures 128. In the manufacturing process, the clamping member 120 is stamped from sheet metal material, of approximately 17 gauge, as a flat piece and is formed about the threaded pivot member 130. The general configuration of the stamped but unformed clamping member 120 is illustrated in FIG. 10.

Still with reference with FIGS. 6 and 7, the threaded pivot member 130 has a threaded barrel portion 132 and oppositely extending arms 134. The arms 134 are dimensioned to fit closely within the apertures 128 but to still permit the clamping member 120 to rotate about the arms 134. As a result of forming the body 122 about the threaded pivot member 130, the likelihood of separation of the two elements is greatly reduced. With respect to the threaded barrel portion 132, its thread pattern mates with and complements the threaded portion 42 of the shaft member 40. Like the preferred embodiment, the threaded barrel portion 132 is long enough to enclose at least three complete convolutions of the shaft 40.

Figure 10:
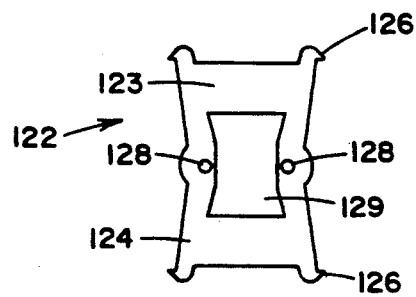
FIG. 10 illustrates a clamping body member stamping according to the alternative embodiment prior to formation.

With reference to FIG. 10, it can be seen that the unformed clamping body 122 includes the apertures 128 which will receive the arms 134 of the pivot member 130. During assembly of the pivot member 130 to the body 122, the pivot member is secured in a tool and the body 122 is formed about it so that the arms 134 extend through the apertures 132.

Figure 11:
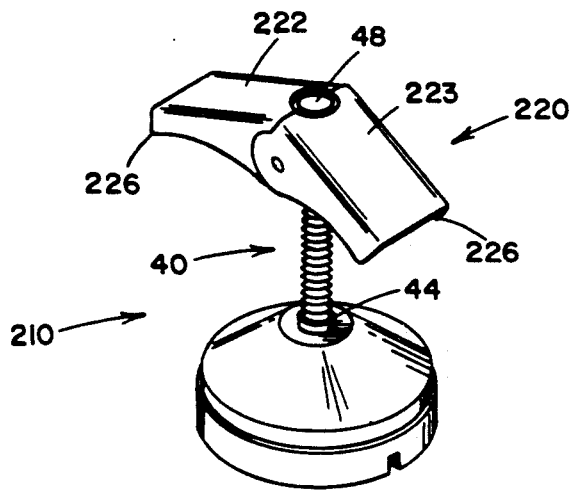
FIG. 11 illustrates another alternative embodiment of the invention.
Figure 12:
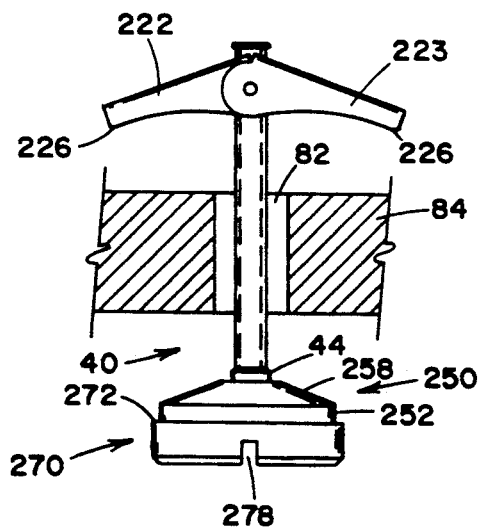
FIG. 12 illustrates placement of the other alternative embodiment in a drain hole.
Figure 13:
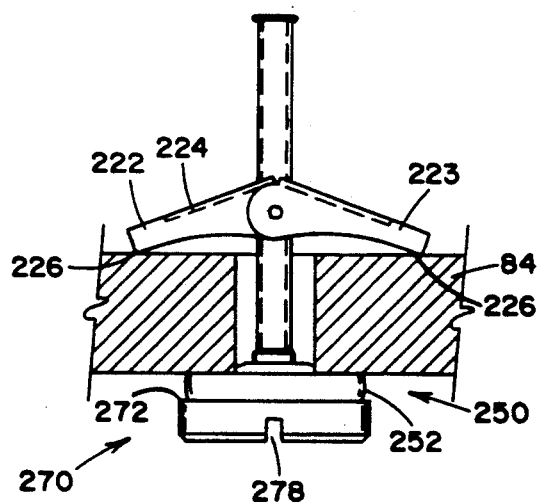
FIG. 13 illustrates the other alternative embodiment secured in the drain hole.

FIGS. 11 through 13 depict another alternative embodiment of the present invention which may be useful for those applications where removal does not appear to be a desired option and the particular configuration of the reservoir does not call for the double sealing points which are accomplished with the earlier embodiments. Many of the features of the closure 210 are similar to those previously described and will not be described again, however, those distinctive features of this alternative embodiment will be described.

As shown in FIG. 11, the alternative embodiment of the clamping member differs from that of the earlier embodiments in that the body member is divided into two movable halves or segments 222 and 223. This configuration is similar to that generally associated with a toggle bolt. As in the prior embodiments, the body halves 222 and 223 are provided with teeth 226 at the respective ends thereof. As can be seen from FIG. 13, a spring member 224 urges the body members 222 and 223 toward the horizontal plane.

With reference to FIG. 12, the backing member 270 of this embodiment is preferably unitary with the shaft 40. Thus, the shaft 40 and the backing member 270 will generally appear as a long threaded shoulder bolt with a flat, washer-like head. A screwdriver slot 278 is provided. The sealing member 250 has a generally circular base 252 and a tapered central nub 258. Once again, the central nub is dimensioned so as to initially enter the aperture 82 without contact with the pan or reservoir defining the aperture. In order to insert the body members 222 and 223 into the aperture 82, they are depressed into the vertical plane and against the shaft 40. Once they have cleared the aperture, they are permitted to spring open and the teeth 226 are urged into engagement with the interior of pan 84. At that point, the closure is tightened until the sealing member 250 bulges slightly or shows a slight deformation in the side walls of the base 252, see FIG. 13. At this point, the tapered central nub will be in a line of contact with the pan defining the aperture. Once again, the sealing member provides a visual indication that full contact has been made.

I claim:

1. A removable replacement closure assembly for the drain hole of an engine fluid reservoir, said assembly comprised of:

a shaft with a threaded portion at a first end thereof and an end cap at the other end;

a generally rectangular clamping member sized to pass through the drain hole and into the reservoir and including a threaded portion that mates with the threaded portion of the shaft, the clamping member has a length which is greater than the maximum dimension of the drain hole and pivots on the shaft, the clamping member is retained on the shaft by a modification of the first end which prevents complete unthreading of the shaft from the clamping member;

a resilient sealing member having a sealing surface area which is greater than the area of the drain hole and a central aperture through which the shaft passes, the material of the sealing member withstands continuous heat of at least 250 degrees Fahrenheit; and a backing member attached to the shaft at a position spaced from the clamping member and below the sealing member so that the sealing member is positioned between the backing member and the clamping member and the end cap of the shaft contacts the backing member.

2. The replacement closure of claim 1 wherein the clamping member includes a plurality of teeth like projections which extend toward the backing member.

3. The replacement closure of claim 1 wherein the sealing member has a tapered central nub.

4. The replacement closure of claim 3 wherein a circumferential valley surrounds the tapered central nub.

5. The replacement closure of claim 4 wherein an outer ring surrounds the circumferential valley.

6. The replacement closure of claim 5 wherein the outer ring terminates in a horizontal plane which is below the horizontal plane defined by the termination of the tapered central nub.

7. The replacement closure of claim 1 wherein the backing member defines a seat which receives the sealing member.

8. The replacement closure of claim 1 wherein the backing member includes a gripping member on the surface opposite to the sealing member.

9. The replacement closure of claim 1 wherein the sealing member is a molded elastomeric material which is resistant to oil and hydrocarbons and will withstand continuous heat in excess of 250 degrees Fahrenheit.

10. The replacement closure of claim 1 wherein the clamping member is comprised of a body portion and a threaded pivot member.

11. The replacement closure of claim 10 wherein the body member is formed about the threaded pivot member.

12. The replacement closure assembly of claim 11 wherein the backing member includes a seat that receives the sealing member therein.

13. The replacement closure of claim 1 wherein the sealing member has a sealing surface area which includes at least two independent sealing portions.

14. The replacement closure of claim 1 wherein the first end of the shaft is flared.

15. The replacement closure of claim 1 wherein the clamping member rotates into a position generally parallel to the shaft for passage through the drain hole and, after passing through the drain hole, the clamping member rotates into a position generally perpendicular to the shaft and the interior surface of the reservoir defining the drain hole.

16. A replacement closure assembly for the drain hole of a fluid reservoir, which comprises:

a shaft with a threaded portion at a first end thereof and an end cap at the other end thereof;

a clamping member sized to pass through the drain hole and into the reservoir;

a pivot member having a threaded barrel portion that mates with the threaded portion of the shaft and opposed arms that extend from the barrel and secure the clamping member to the pivot member;

a compressible sealing member having a central aperture through which the shaft passes, a tapered central nub, concentrically positioned about the aperture and dimensioned to enter into and engage the reservoir defining the drain hole, and an outer ring, concentrically positioned about the central nub, which overlies the drain hole; and a backing member attached to the shaft at a position spaced from the clamping member and below the sealing member so that the sealing member is positioned between the backing member and the clamping member and the end cap contacts the backing member.

17. The replacement closure assembly of claim 16 further comprising a finger grip channel connected to the side of the backing member opposite the sealing member.

18. A replacement closure assembly for the drain hole of an automotive oil reservoir, which comprises:

a shaft with a threaded portion at a first end thereof and an end cap at the other end thereof;

a pivot member having a threaded portion that mates with the threaded portion of the shaft and opposed arms that extend outwardly and pivotally secure a clamping member to the pivot member, the clamping member pivots between a vertical position, which is generally parallel to the shaft for insertion through the drain hole and into the reservoir, and a position which is generally horizontal to the interior of the reservoir defining the drain hole, in the horizontal position the clamping member does not pass through the drain opening;

a resilient sealing member having a central aperture through which the shaft passes and a sealing surface area which overlies the drain hole; and a backing member attached to the shaft at a position spaced from the clamping member and below the sealing member so that the sealing member is positioned between the backing member and the clamping member and the end cap contacts the backing member.

19. The replacement closure of claim 18 wherein the clamping member is formed of two identical half members which are mated and secured together.

20. The replacement closure of claim 19 wherein the half members are secured by weldments and the clamping member has an overall length of approximately 1.65 inches, a width of about 0.3 inches and a maximum height of about 0.40 inches.

* * * * *